May 19, 1931.  G. W. LENTZ  1,806,572
CHIPPING MACHINE
Filed Nov. 26, 1928   4 Sheets-Sheet 1
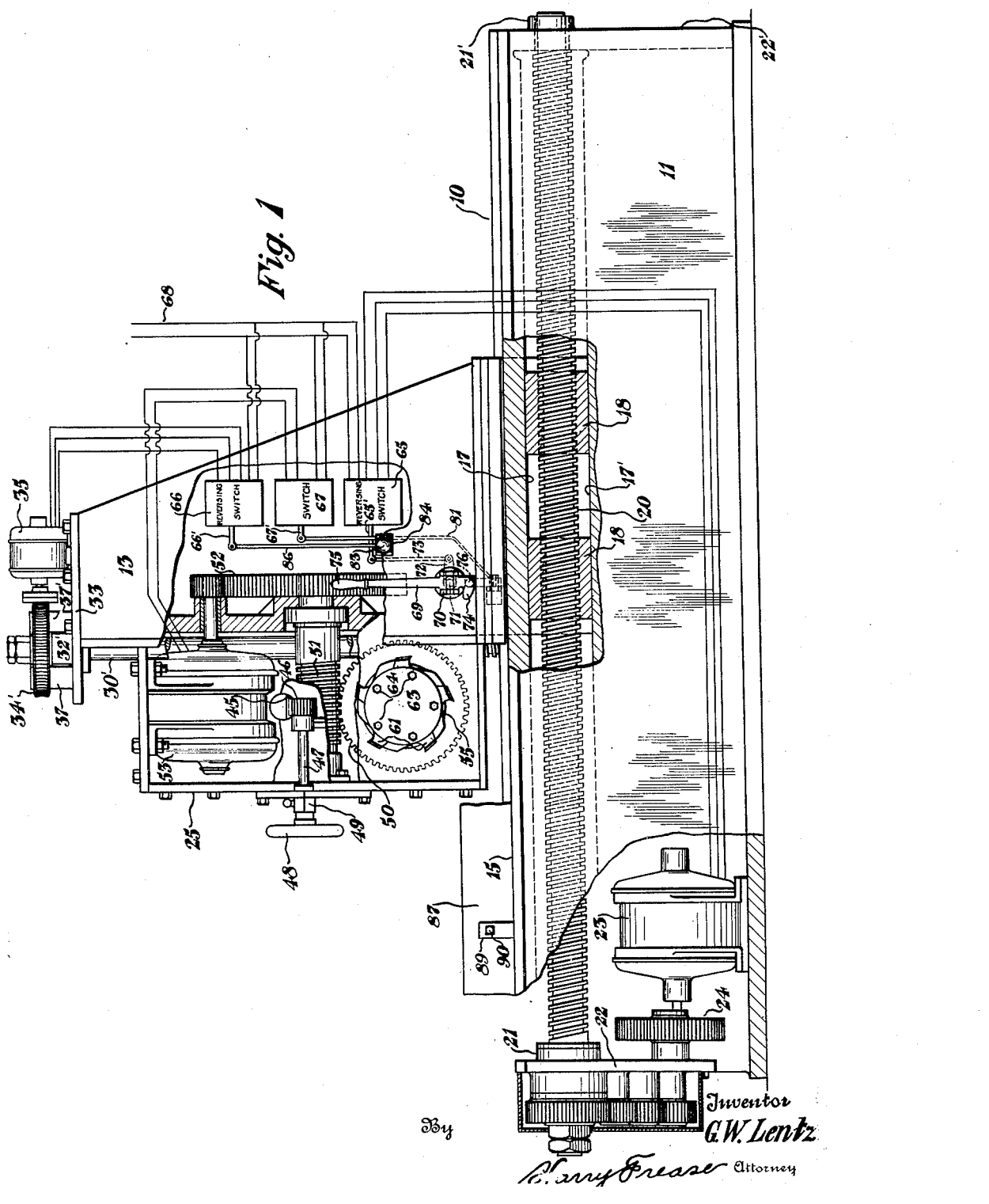

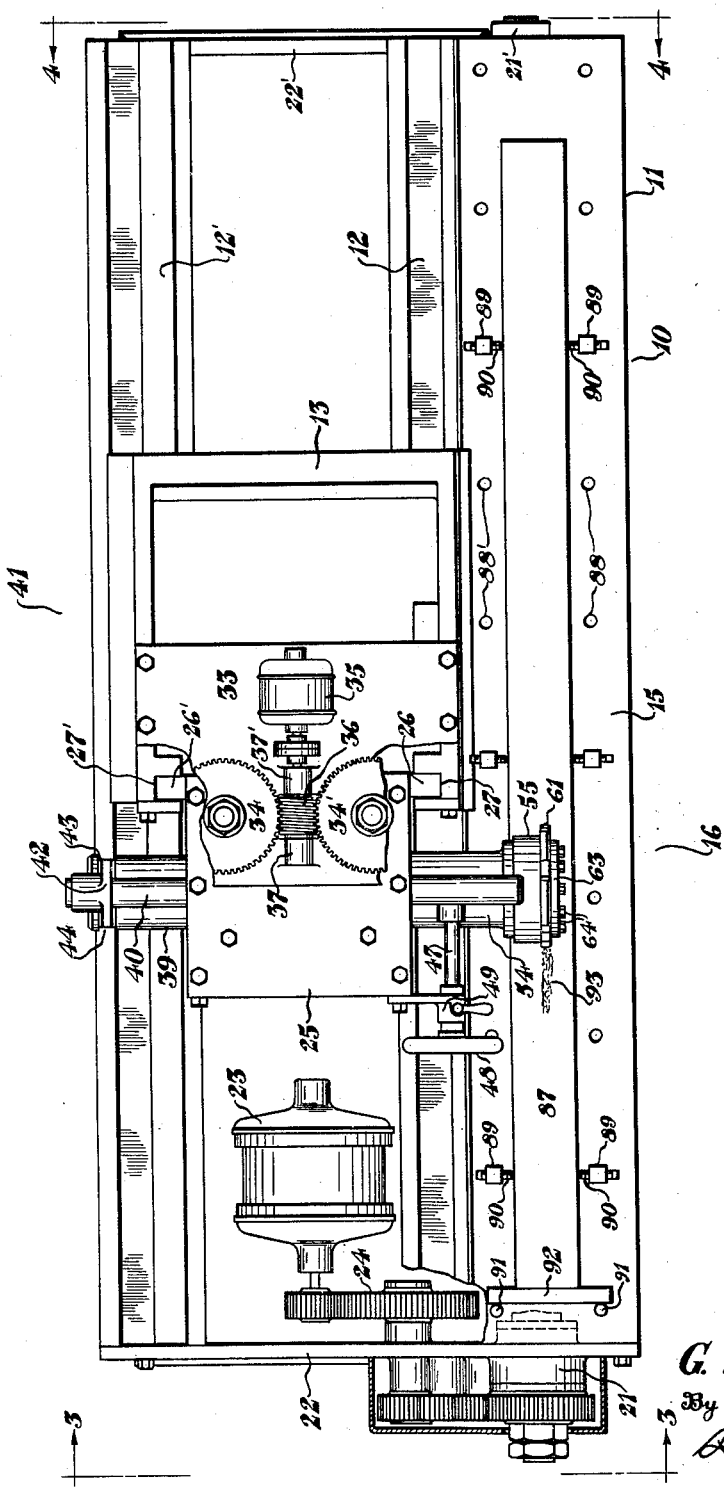

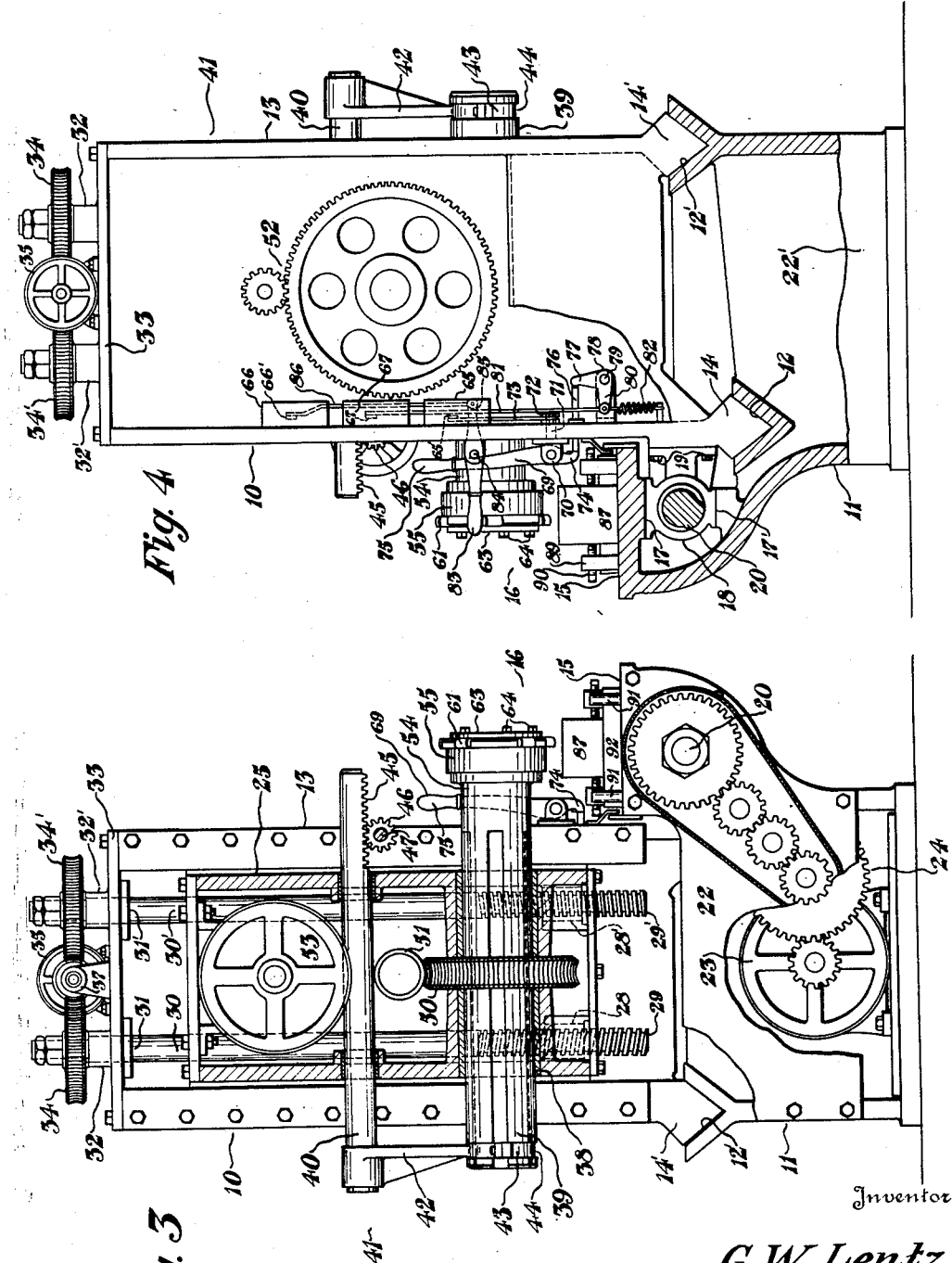

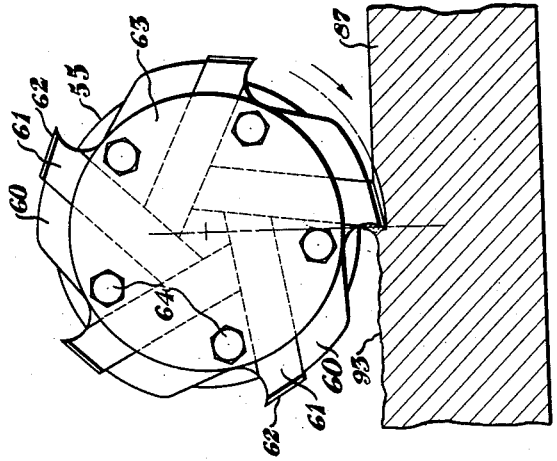
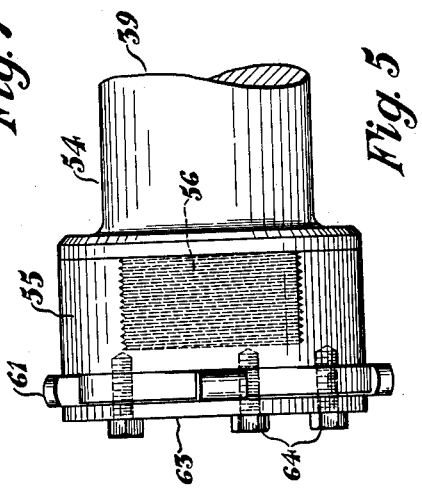
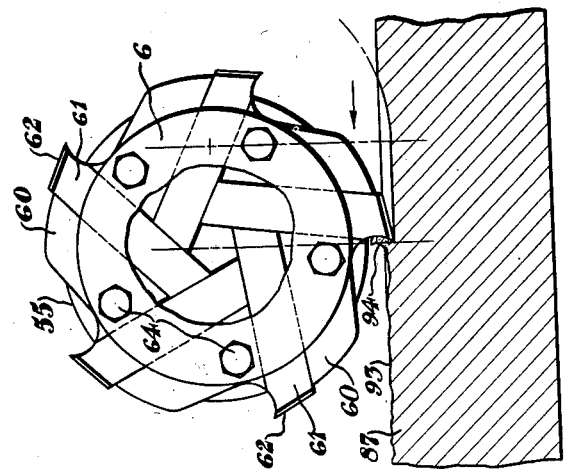
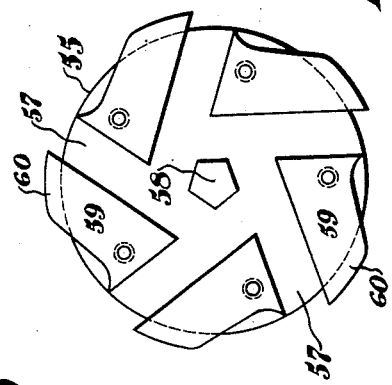
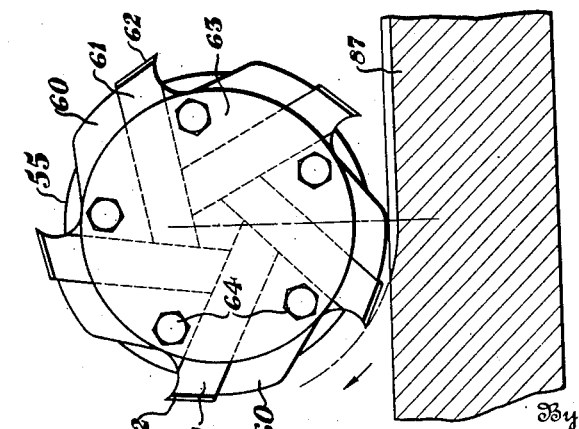

Patented May 19, 1931

1,806,572

UNITED STATES PATENT OFFICE

GEORGE W. LENTZ, OF CANTON, OHIO, ASSIGNOR TO THE BONNOT COMPANY, OF CANTON, OHIO, A CORPORATION OF OHIO

CHIPPING MACHINE

Application filed November 26, 1928. Serial No. 321,881.

My invention relates to machines for removing surface defects from semi-finished rolling mill products, such as billets.

These surface defects include scale, seams, slivers, snakes, scabs, and the like, and must be properly removed from the semi-finished product, if the finished product rolled therefrom is to be satisfactory.

The usual method of eliminating such surface defects, is by means of a manually operated portable pneumatic chipper.

Each of such chippers requires an operator, the work progress is slow, and it is very difficult if not impossible for any individual operator to remove all surface defects in a uniform and in the proper manner. Moreover it is practically impossible to obtain uniform and proper work from the large number of operators required for chipping in the usual steel mill.

It has been proposed to provide special planing machines for removing the aforesaid defects from billets and the like, but in order to accommodate the larger billets, which may be 30 feet long, such a special planing machine requires a total floor space of over 55 feet in length, and the total floor space requirements for a sufficient number of such planing machines to accommodate the capacity of a usual steel mill is prohibitive.

Moreover the moving table of such a special planing machine, requires an excessive amount of power for its movement.

Furthermore, from the standpoint of safety, in a planing machine the end of a billet sometimes extends beyond the end of the table, and workmen have been injured by billets moving in this manner.

Accordingly the objects of the present improvements include the provision of a chipping machine in which the work, that is, the billet or other semi-finished rolled product, is stationarily mounted, and is operated on by a moving tool head.

Further objects of the improvements include the provision of a moving tool head which is adapted for combining the movements of a milling machine and a shaper, for selectively imparting to the cutting tools on the head, a rotary and/or a translatory movement, whereby a tool may be rotated into the billet a suitable distance, after which a translatory movement of the tool will then remove all or a longitudinal portion of the surface defect regardless of its length, and a final rotary movement of the tool will remove the tool from the billet, or whereby material may be removed from the billet by continuous rotation of the tool, or by combined rotary and translatory movement of the tool.

Further objects of the improvements include the provision of a novel arrangement of the various parts and controls for the chipping machine, wherein the means for controlling the translatory and rotary movements of the tool are located on a moving carriage on which the moving tool head is operatively mounted, and whereby extreme rapidity and flexibility of operation of the machine is attained.

These and ancillary objects are attained in the present invention, a preferred embodiment of which is hereinafter set forth in detail, and is illustrated in the accompanying drawings forming part hereof, in which Figure 1 is a fragmentary side view of the work side of a preferred embodiment of the improved chipping machine;

Fig. 2, a fragmentary plan view thereof;

Fig. 3, a view of one end thereof looking in the direction of the arrows 3—3, Fig. 2;

Fig. 4, another end view thereof looking in the direction of the arrows 4—4, Fig. 2;

Fig. 5, a detached side elevation of the improved tool head for the improved chipping machine;

Fig. 6, an end elevation thereof, showing the clamping plate and the tools removed;

Fig. 7, a fragmentary view with distant parts removed, illustrating the tool head operating on a billet, after the completion of a tool inserting rotary milling cutting operation;

Fig. 8, a view similar to Fig. 7 illustrating the tool head during a translatory shaper cutting operation on the billet; and Fig. 9, a view similar to Figs. 7 and 8 illustrating the tool head at the end of a tool removing rotary cutting operation.

Similar numerals refer to similar parts throughout the several views.

The improved chipping machine indicated generally at 10 includes a longitudinally extending bed 11, in the upper surfaces of which are provided longitudinally extending carriage-ways 12 and 12'.

A tool head carriage 13 is mounted for longitudinally sliding in the ways 12 and 12' as by means of longitudinally extending slide tongues 14 and 14' depending from the carriage and slidably fitting respectively in the ways 12 and 12'.

A longitudinally extending work supporting table 15 is provided at the work side 16 of the bed, and upper and lower longitudinally extending bearing surfaces 17 and 17' are formed in the bed 11, preferably below the upper work mounting surface of the work table 15.

Coaxial longitudinally spaced longitudinal feed nuts 18 are slidably mounted between the upper and lower longitudinal bearing surfaces 17 and 17' and are secured at one side as by screws 19 to the carriage 13.

The longitudinal feed nuts 18 have screwed therein a longitudinal feed screw 20 which is journalled at 21 and 21' in the bed ends 22 and 22', respectively.

A reversing motor 23 is connected by suitable gearing indicated generally at 24 with the feed screw 20 for rotating the same for longitudinally feeding or sliding the carriage 13 in one direction or the other in the bed ways.

A tool head elevator 25 is mounted for vertical movement upwards and downwards in the carriage 13, as by means of vertical guide tongues 26 and 26', which extend outwardly from the elevator and are slidably mounted, respectively, in vertically extending grooves 27 and 27' formed in the carriage 13.

Preferably at the lower end of the elevator 25, laterally spaced elevator nuts 28 and 28' are secured, and one of the nuts is right hand and the other nut is left hand; and in the nuts 28 and 28', respectively, are screwed the lower threaded ends 29 and 29' of elevator screw shafts 30 and 30'. The upper ends 31 and 31' of the shafts are journalled in suitable bearings 32 and 32' formed in a preferably removable top plate 33 of the carriage 13, and worm wheels 34 and 34' are secured, respectively, on the upper ends of the screw shafts above the bearings 32 and 32', one of the worm wheels being rotated right hand and the other being rotated left hand.

A reversing elevator motor 35 is mounted on the carriage top plate, and is provided with a driving connection with an elevator worm 36, which is journalled in bearings 37 and 37' on the carriage top plate 33, the elevator worm 36 extending between and being meshed with the worm wheels 34 and 34'.

Accordingly, the reversing elevator motor 35 will raise or lower the tool head elevator 25, depending upon the direction of rotation of the worm 36.

The elevator 25 is provided at its lower end with a horizontally extending tool head shaft bearing 38, the axis of which extends transversely of and preferably at right angles to the vertical plane containing the longitudinal axis of the bed 11, and the vertical axis of the elevator 25.

A tool head shaft 39 is slidably journalled in the bearing 38, and means are provided for horizontally sliding the tool head shaft 39 endwise in its bearing 38, which may include a rack bar 40 vertically spaced from and parallel with the tool head shaft 39, and slidably mounted for horizontal movement in the elevator 25.

At the back side 41 of the machine, an arm 42 is secured to the rack bar 40 and extends vertically downwardly therefrom, and is provided at its lower end with a separable collar 43 which rotatably fits in a groove 44 formed in the back end of the tool head shaft 39.

At the work end of the rack bar 40, rack teeth 45 are formed, and are meshed with a pinion 46 which is secured at the end of a pinion shaft 47 journalled in the elevator 25, and on the outer end of which pinion shaft is secured a hand wheel 48. Means are provided for securing the pinion and rack at any position of adjustment, and such means may be a clamping collar 49, through which the pinion shaft 47 extends, and which collar is secured upon the elevator 25.

The tool head shaft 39 slidably extends through a suitable aperture in a tool head shaft rotating worm wheel 50, which is journalled for rotation in the elevator 25; and the worm wheel 50 is meshed with a drive worm 51 which is driven through suitable gearing 52 by a tool head shaft rotating motor 53 mounted within the elevator 25.

Upon the work end 54 of the tool head shaft 39, a tool head 55 is removably secured, as by means of a threaded stud 56 of reduced diameter and formed on the work end of the shaft 39, and which stud is screwed in a threaded socket formed in the tool head 55.

The tool head 55, is cylindric throughout the major portion of its body, and in the outer end thereof, a plurality of tool mounting grooves 57 are formed, each groove extending at right angles with the axis of rotation 58 of the shaft 39 and head 55, and all the grooves being radially offset equal distances from the axis 58, so that the grooves make junctions with each other at equal angles.

A plurality of tool back-up zones 59 are thus formed on the outer end of the tool head, and each zone 59 may extend outwardly at 60 beyond the main cylindric surface of the tool head.

A cutting tool 61 fits in each groove 57, and the outer end 62 of the cutting tool is preferably ground, as illustrated, to make a gouge cut; and in accordance with the aforesaid positioning of the tool mounting grooves 57, each cutting tooth tool 61 is rotated by the shaft 39 or is moved by longitudinal movement of the carriage 13 in planes parallel with the longitudinal direction of movement of the carriage 13.

A clamping plate 63 is removably secured, as by means of cap screws 64, to the body of the tool head 55, for securely clamping the tools 61 between the plate 63 and body of the tool head.

A reversing switch 65 is mounted on the carriage 13 for controlling the longitudinal feed motor 23. A reversing switch 66 is similarly mounted on the carriage for controlling the elevator motor 35, and a switch 67 is similarly mounted on the carriage for controlling the tool head shaft rotating motor 53.

These switches are connected in a well known manner by suitable conductors with their respective motors, and with the conductors of a power supply 68.

The switches 65, 66, and 67 are actuated, respectively, by the levers 65', 66', and 67' extending therefrom.

Common control means for the longitudinal carriage feed and for rotating the tool head, are provided by a control lever 69, which is pivotally mounted in a yoke 70 for pivoting of the lever about an axis in a longitudinal vertical plane, and the yoke is mounted on a yoke shaft 71 in the carriage for pivoting the yoke and the control lever about a horizontal axis perpendicular to a longitudinal vertical plane.

A longitudinal feed switch actuating arm 72 is secured on the yoke shaft 71, and is connected by a link 73 with the switch lever 65' of the reversing switch 65 for the longitudinal feed carrriage motor 23.

The lever 69 is provided below the yoke 70, with a sectoral tool head shaft rotating motor switch actuating arm 74, the sectoral arm 74 lying in the third quadrant as viewed in Fig. 1, and the control lever 69 being in vertical neutral position as viewed in Fig. 1.

By pulling outwardly on the upper handle 75 of the control lever 69, when the control lever 69 is in the neutral position, or, as viewed in Fig. 1, is to the left of the vertical axis, the inner surface of the sectoral arm 74 may be abutted against the outer end of a bell crank actuating pin 76 slidably mounted in the carriage, and the inner end of the pin 76 abuts against the outer end of one arm 77 of a bell crank 78 which is mounted on a pivot 79 supported on the carriage, and the other arm 80 of the bell crank is connected by a link 81 with the tool head shaft rotating motor switch lever 67'.

A spring 82 is connected at one end with one of the bell crank arms, and at the other end to the carriage, and the spring normally maintains the switch 67 in open circuit position, except when the pin 76 is pushed inwardly by the control lever 69.

When the control lever is rotated on its yoke shaft to the left as viewed in Fig. 1, the connections of the switch 65 are such that the carriage will be moved to the left by the appropriate rotation of the shaft of the motor 23.

The cutting outer ends 62 of the tools 61 are formed to cut when rotating or translating from right to left in planes parallel with the direction of movement of the carriage 13 and angular to the work surface being cut, and accordingly by the aforesaid arrangement of the control lever 69 and switches 65 and 67, the tool head shaft may be rotated when the carriage is stationary or when moving to the left, but may not be rotated when the control lever 69 is rotated to the right about the yoke shaft, for reversing the motor 23 to move the carriage to the right as viewed in Fig. 1, since the sectoral arm 74 will then not strike against the outer end of the pin 76.

For actuating the elevator switch 66, a lever handle 83 is mounted at 84 on the carriage for pivoting about a horizontal axis in the longitudinal plane. The handle 83 extending outwardly from the carriage, adjacent the control lever 69, and at the opposite side of its pivotal mounting, the lever handle extends within the carriage, as an elevator switch actuating arm 85, the outer end of which is connected by a link 86 with the lever 66' of the elevator switch 66, and the connections of the switch are such that movement of the handle 83 upwards causes the shaft for the motor 35 to rotate to raise the elevator 25, and movement of the handle 83 downwards, reverses the motor 35 to lower the elevator 25, and the horizontal position of the handle lever 83 being neutral.

The work supporting table 15 is provided with means for securing thereon the work, which may be a billet 87.

The work securing means may include a plurality of sets of opposite sockets 88 and 88' formed in the top of the work table, and a clamping stud 89 may be removably secured in each of the sockets of a plurality of sets. Each stud 89 may include a horizontally extending threaded aperture in which is screwed a clamping screw 90, and the sides of the billet 87 may be securely clamped between the oppositely extending ends of the screws 90.

For preventing endwise movement of the billet, pins 91 may be inserted in a set of the sockets 88 and 88', and an end thrust bar 92 may be bridged across the pins 91 and receive the end thrust of the billet 87.

The billet 87 may have the surface defect indicated at 93, and after clamping the billet 87 as illustrated, the elevator is lowered to a position from which one of the tools 61 of the tool head may be rotated from right to left parallel to the longitudinal direction of movement of the carriage and angular to the upper work surface of the billet for cutting into the upper work surface of the billet to the translatory cutting position illustrated in Fig. 7.

The carriage is then moved longitudinally from right to left, with the cutting head preferably maintained stationary so that the cutting tool 61 by its translatory longitudinal movement will longitudinally gouge out material 94 in the zone of the surface defect. After the particular cutting tool 61 has been moved longitudinally of the billet a sufficient distance to gouge out all of the material of the zone of the surface defect in the path of the tool, the tool head is further rotated from right to left as indicated in Fig. 9, removing the particular cutting tool from the billet and positioning the next tool ready for insertion to make another cut.

The groove thus cut by the cutting tool gradually slopes at its sides and ends and merges with the main surface of the billet, and there are no abrupt edges or overhangs, and thus the surface defect is properly removed for permitting satisfactory subsequent rolling of the billet.

If the surface defect is of substantial width, the cutting head may be moved laterally by operation of the hand wheel 48 to any desired position for making another desired longitudinal cut.

The hand wheel 48 is also used to laterally position the tool head with respect to any surface defect which it is desired to remove from the billet.

If the surface defect covers only a relatively small area, spot chipping may be effected by continuous rotation of the tool head, operation of the elevator, and operation of the means for laterally shifting the tool head shaft.

While the bed and work table may be of any desired length, since the work remains stationary, and is only operated on by the cutting head through fractional portions of its length, it is obvious that for ordinary use, the bed need not be of excessive length, since extra long billets may be operated on first at one end and then at the other.

The tool head may, of course, be rotated during translatory movement thereof, but it is preferred to obtain suitable translatory cutting speed without rotation of the tool head, thereby saving power, and reducing wear.

The novel combination of the rotatable and translatable tool head with a stationary work holding bed, is not only useful for the purpose of removing surface defects from billets and the like, but may be used for other purposes, particularly whenever material is to be removed from large surfaces of heavy masses.

It will be observed that by the operative mounting of the tool head for selective rotation on the carriage, and by operatively mounting the carriage for translatory movement on the bed, the outer end of each tooth tool on each tool head is adapted for cutting by selective movement of the carriage, rotation of the tool with the tool head, or combined movement of the carriage and rotation of the tool head.

Novel subject matter illustrated but not claimed herein, is included and claimed in my co-pending application for United States Letters Patent for Chipping machines, filed July 3, 1930, Serial No. 465,582.

I claim:

1. A machine tool including a stationary bed, a carriage mounted for translatory movement on the bed, a tooth tool operatively mounted on the carriage for selective rotation about an axis extending transversely of the direction of movement of the carriage, and means whereby the tooth tool is adapted for cutting by selective movement of the carriage, rotation of the tool, or combined movement of the carriage and rotation of the tool.

2. A machine tool including a stationary bed, a carriage mounted for translatory movement on the bed, a tooth tool operatively mounted on the carriage for selective rotation about an axis extending transversely of the direction of movement of the carriage, means whereby the tooth tool is adapted for cutting by selective movement of the carriage, rotation of the tool, or combined movement of the carriage and rotation of the tool, said means including power means for selectively rotating the tool, and power means for moving the carriage.

3. A machine tool including a stationary bed, a carriage mounted for horizontal movement on the bed, an elevator mounted for vertical movement on the carriage, a tooth tool operatively mounted on the elevator for selective rotation about an axis extending transversely of the direction of movement of the carriage, and means whereby the tooth tool is adapted for cutting by selective movement of the carriage, rotation of the tool, or combined movement of the carriage and rotation of the tool.

4. A machine tool including a stationary bed, a carriage mounted for horizontal movement on the bed, an elevator mounted for vertical movement on the carriage, a tooth tool operatively mounted on the elevator for selective rotation about an axis extending transversely of the direction of movement of the carriage, means whereby the tooth tool is adapted for cutting by selective movement of the carriage, rotation of the tool, or combined movement of the carriage and rotation of the tool, said means including power means for selectively rotating the tool, means for vertically moving the elevator on the carriage, and power means for horizontally moving the carriage on the bed.

5. A machine tool including a stationary bed, a carriage mounted for translatory movement on the bed, a tooth tool operatively mounted on the carriage for selective rotation about an axis extending transversely of the direction of movement of the carriage, means whereby the tooth tool is adapted for cutting by selective movement of the carriage, rotation of the tool, or combined movement of the carriage and rotation of the tool, said means including means for selectively rotating the tool, means for moving the carriage, and means located on the carriage for controlling the operation of the tool rotating means and the carriage moving means.

6. A machine tool including a stationary bed, a carriage mounted for longitudinal movement on the bed, a tooth tool operatively mounted on the carriage for selective rotation about an axis extending transversely of the direction of movement of the carriage, means whereby the tooth tool is adapted for cutting by selective movement of the carriage, rotation of the tool, or combined movement of the carriage and rotation of the tool, and means for laterally adjusting the position of the tool with reference to the bed.

7. A machine tool including a stationary bed, a carriage mounted for longitudinal movement on the bed, a tooth tool operatively mounted on the carriage for selective rotation about an axis extending transversely of the direction of movement of the carriage, means whereby the tooth tool is adapted for cutting by selective movement of the carriage, rotation of the tool, or combined movement of the carriage and rotation of the tool, and the bed including a longitudinally extending work supporting table at one side thereof and beneath the tool.

8. A machine tool including a stationary bed, a carriage mounted for longitudinal movement on the bed, a tooth tool operatively mounted on the carriage for selective rotation about an axis extending transversely of the direction of movement of the carriage, means whereby the tooth tool is adapted for cutting by selective movement of the carriage, rotation of the tool, or combined movement of the carriage and rotation of the tool, said means including power means for selectively rotating the tool, and power means for moving the carriage, the bed including a longitudinally extending work supporting table at one side thereof and beneath the tool.

9. A machine tool including a stationary bed, a carriage mounted for longitudinal movement on the bed, a tooth tool operatively mounted on the carriage for selective rotation about an axis extending transversely of the direction of movement of the carriage, means whereby the tooth tool is adapted for cutting by selective movement of the carriage, rotation of the tool, or combined movement of the carriage and rotation of the tool, the bed including a longitudinally extending work supporting table at one side thereof and beneath the tool, and means for laterally adjusting the position of the tool with reference to the table.

10. A machine tool including a stationary bed, a carriage mounted for longitudinal movement on the bed, a tooth tool operatively mounted on the carriage for selective rotation about an axis extending transversely of the direction of movement of the carriage, means whereby the tooth tool is adapted for cutting by selective movement of the carriage, rotation of the tool, or combined movement of the carriage and rotation of the tool, said means including power means for selectively rotating the tool, power means for moving the carriage, the bed including a longitudinally extending work supporting table at one side thereof and beneath the tool, and means for laterally adjusting the position of the tool with reference to the table.

11. A machine tool including a stationary bed, a carriage mounted for translatory movement on the bed, a tool head, a plurality of tooth tools secured on the tool head, the tool head being operatively mounted on the carriage for selective rotation about an axis extending transversely of the direction of movement of the carriage, and means whereby each tooth tool is adapted for cutting by selective movement of the carriage, rotation of the tool head, or combined movement of the carriage and rotation of the tool head.

12. A machine tool including a stationary bed, a carriage mounted for translatory movement on the bed, a tooth tool operatively mounted on the carriage for selective rotation about an axis extending transversely of the direction of movement of the carriage, means whereby the tooth tool is adapted for cutting by selective movement of the carriage, rotation of the tool, or combined movement of the carriage and rotation of the tool, and means for stationarily mounting work to be operated on by the tool.

13. A machine tool including a stationary bed, a carriage mounted for translatory movement on the bed, a shaft operatively mounted on the carriage for sliding endwise and for selective rotation about its axis, the axis of the shaft extending transversely of the direction of movement of the carriage, a tooth tool secured on the shaft and extending angularly therefrom, and means whereby the tooth tool is adapted for cutting by selective translatory movement of the carriage, rotation of the shaft, or combined translatory movement of the carriage and rotation of the shaft.

14. A machine tool including a stationary bed, a carriage mounted for translatory movement on the bed, a shaft operatively mounted on the carriage for sliding endwise and for selective rotation about its axis, the axis of the shaft extending transversely of the direction of movement of the carriage, a tooth tool secured on the shaft and extending angularly therefrom, means whereby the tooth tool is adapted for cutting by selective translatory movement of the carriage, rotation of the shaft, or combined translatory movement of the carriage and rotation of the shaft, said means including power means for selectively rotating the shaft, and power means for moving the carriage.

15. A machine tool including a stationary bed, a carriage mounted for translatory movement on the bed, a shaft operatively mounted on the carriage for sliding endwise and for selective rotation about its axis, the axis of the shaft extending transversely of the direction of movement of the carriage, a tooth tool secured on the shaft and extending angularly therefrom, means whereby the tooth tool is adapted for cutting by selective translatory movement of the carriage, rotation of the shaft, or combined translatory movement of the carriage and rotation of the shaft, said means including power means for selectively rotating the shaft, power means for moving the carriage, and means located on the carriage for controlling the operation of the shaft rotating means and the carriage moving means.

In testimony that I claim the above, I have hereunto subscribed my name.

GEORGE W. LENTZ.